Figure 4:
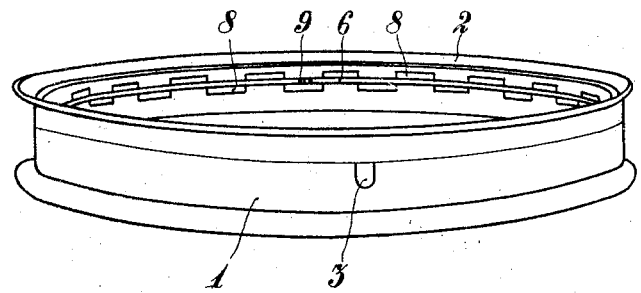

Dec. 22, 1925.                                                 1,566,401
                        K. HALLSTRÖM
                       DETACHABLE RIM
                    Filed Nov. 9, 1923            2 Sheets-Sheet 1
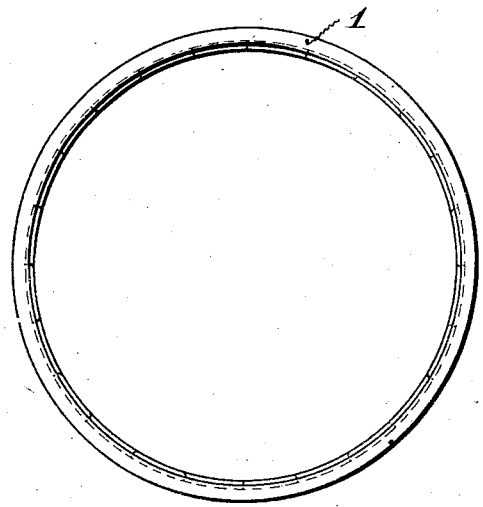
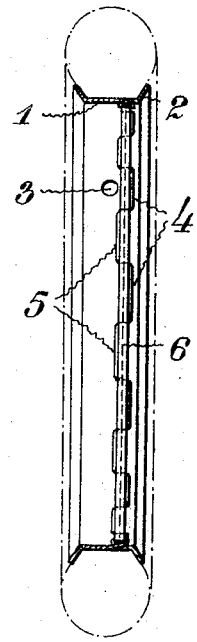
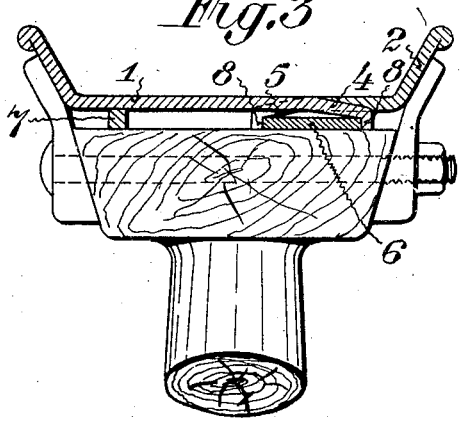
Inventor
K. Hallström
by Langner, Parry, Card & Langner
Attys.

Dec. 22, 1925.  1,566,401

K. HALLSTRÖM

DETACHABLE RIM

Filed Nov. 9, 1923   2 Sheets-Sheet 2

Inventor
K. Hallström
by Langner, Parry, Card & Langner
Attys.

Patented Dec. 22, 1925.

1,566,401

UNITED STATES PATENT OFFICE.

KNUT HALLSTRÖM, OF MALMO, SWEDEN.

DETACHABLE RIM.

Application filed November 9, 1923. Serial No. 673,839.

*To all whom it may concern:*

Be it known that I, KNUT HALLSTRÖM, a citizen of Sweden, residing at Malmo, Sweden, have invented a certain new and useful Detachable Rim, of which the following is a specification, reference being had to the accompanying drawing.

This invention relates to detachable rims for road vehicle wheels and the like of the type comprising two annular parts having their adjacent edges provided alternately with recesses and projections, the recesses and projections on the two rim parts engaging with one another and the free ends of the projections being provided with inwardly extending lips, between which a resilient locking band is adapted to be inserted.

In constructions of this type it has already been suggested to provide two annular rim sections with their inner edges formed with interengaging lug members, alternating members on each rim section being depressed and adapted to overlap and engage with corresponding portions on the opposite rim section.

According to the present invention the projections on each rim section are slightly bent in a radial direction and the parts of the rim sections covering the projections are correspondingly tapered on their underside so that the material of these parts gradually diminishes in thickness, forming a knife edge at the bases of the recesses between the projections so that the rim sections to be pushed into engagement with each other have the form of opposing cones and consequently are self centering. This is of very great practical importance as a factor in facilitating the assembling of the rim sections, and also on account of the fact that after having slightly pressed the rim sections together they will remain firmly united so that they can be freely handled when inserting the locking band without fear of their coming apart.

The invention further offers the advantage that on the outer face of the rim only a very narrow joint extends circumferentially in the plane of the outer surface instead of a wide or stepped joining belt as in the older constructions in which the joints of the engaging members are alternately arranged transversely and circumferentially. When this jointing in the present invention is fairly well effected it will scarcely be noticeable from the outside, and in any case it need not be such that it can possibly damage the air-tube or the tire-cover, which on the contrary, it does not seem possible to prevent in former constructions without special safety arrangements.

Figure 5:
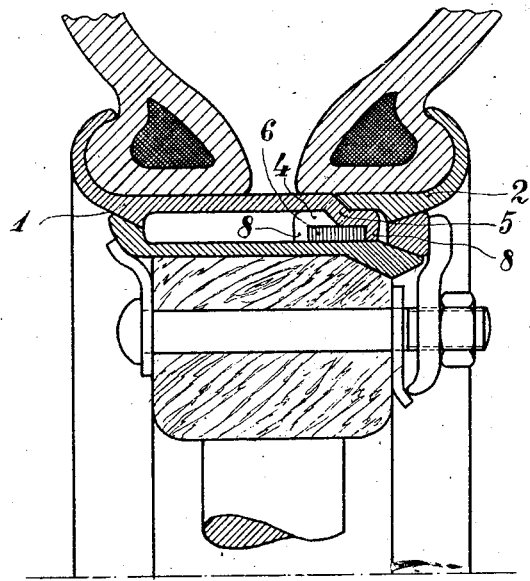

In the accompanying drawings:—Figure 1 is a view of the rim in elevation. Figure 2 is a cross section through the detachable-rim embodying the present invention with a tyre shown in dotted lines. Figure 3 is a cross section on a larger scale of the detachable-rim mounted on a wheel felloe. Fig. 4 is a perspective view of the rim shown in Figs. 1–3. Fig. 5 is a sectional view showing a modified form of the invention. The rim is divided circumferentially and therefore comprises two annular sections 1 and 2. The joining line is preferably not arranged in the centre of the rim as a whole but somewhat displaced and preferably towards that side of the same which when mounting the rim on the wheel lies on the outside. The wider rim section 1 is provided with a hole 3 (Fig. 2) for the valve tube.

The edges of the rim sections at their sides facing each other are provided with flaps with intervening notches, the flaps and the notches being of complementary sizes. The flaps on the rim section 1 are denominated 4 and on the rim section 2 the flaps are denominated 5. The material of the rim sections between the flaps is tapered, as shown in Fig. 3, and closes up in a knife edge at the bottom of the notches whereas the flaps 4 and 5 in a corresponding degree are bent inwardly. It is however obvious that the tapering of the material between the flaps and the corresponding slight bending of the latter may be substituted by a more or less abrupt bending into Z-form of the flaps according to the modification shown in Fig. 5. In assembling the rim sections therefore the flaps of the one rim section may substantially to their whole length be pushed under the material at the notches of the other rim section (Fig. 3). In this manner an even contact surface for the tyre is formed on the outside of the rim.

The locking together of the rim sections is effected by means of a split band 6 which after the rim sections are brought together is inserted between the lips 8 arranged at the free ends of the flaps (see Fig. 3). The band 6 should be somewhat resilient so that it tends to increase its diameter and by this resiliency the band is forced to contact with the flaps between the lips arranged on the latter. If desired one of the flaps may be provided with a pin 9 extending inwardly and adapted to fit in a hole arranged in the band 6 in order to prevent displacement between the band and the rim sections.

When mounting the rim on the felloe of a wheel (Fig. 3) the same is pushed on from the one side in the usual manner. Between the rim and the felloe an annular space is arranged leaving room for the means which keep the rim sections together and which together with a ring 7 or the like arranged between the rim and felloe carry the rim.

The locking band 6 for this reason will be shut in when the rim is mounted on a wheel so that the same cannot be brought out of its place by shaking during the drive, even if these shakings should be so great as to overcome the resiliency of the band.

The rim may be fastened to the felloe and the wheel in any suitable manner, and the usual manner by using clamps and bolts may be adapted.

What I claim and desire to secure by Letters Patent is:—

A detachable rim, comprising, cooperating endless rim sections, each section having cut out portions in its inner edge defining flaps, the flaps being bent inwardly and having tongues at their ends, the edge of each cut out portion in each section being bevelled to correspond with the inward bending of the flaps on the other section, the entire body of each flap of each section, when the sections are placed together to form a rim, being received beneath the bevelled portions of the other section, whereby to leave, on the outer face of the rim, only a longitudinal line of separation between the sections, and a resilient attaching ring received by the tongues.

In testimony whereof, I have signed my name to this specification.

KNUT HALLSTRÖM.